United States Patent Office 2,890,865
Patented June 16, 1959

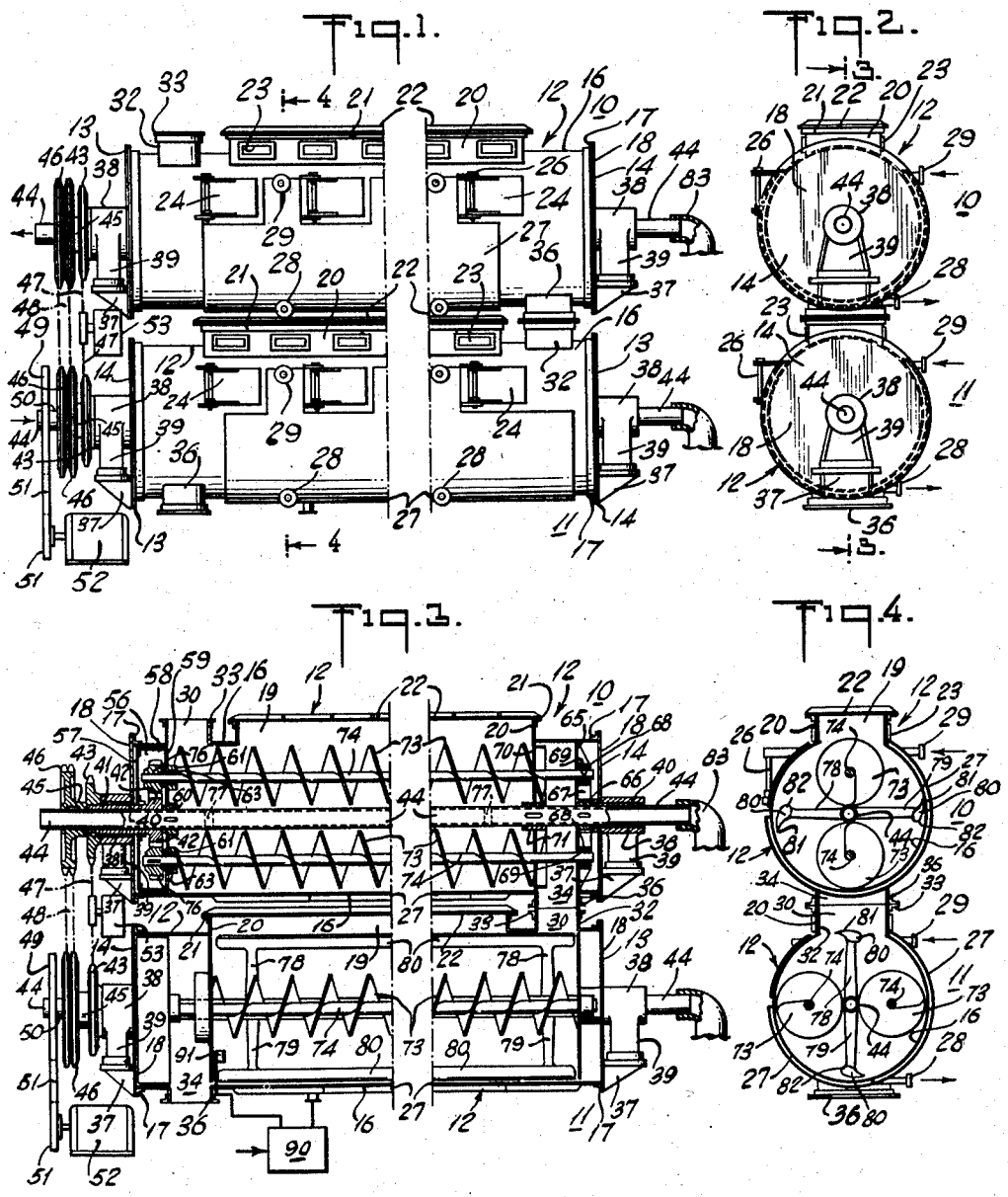

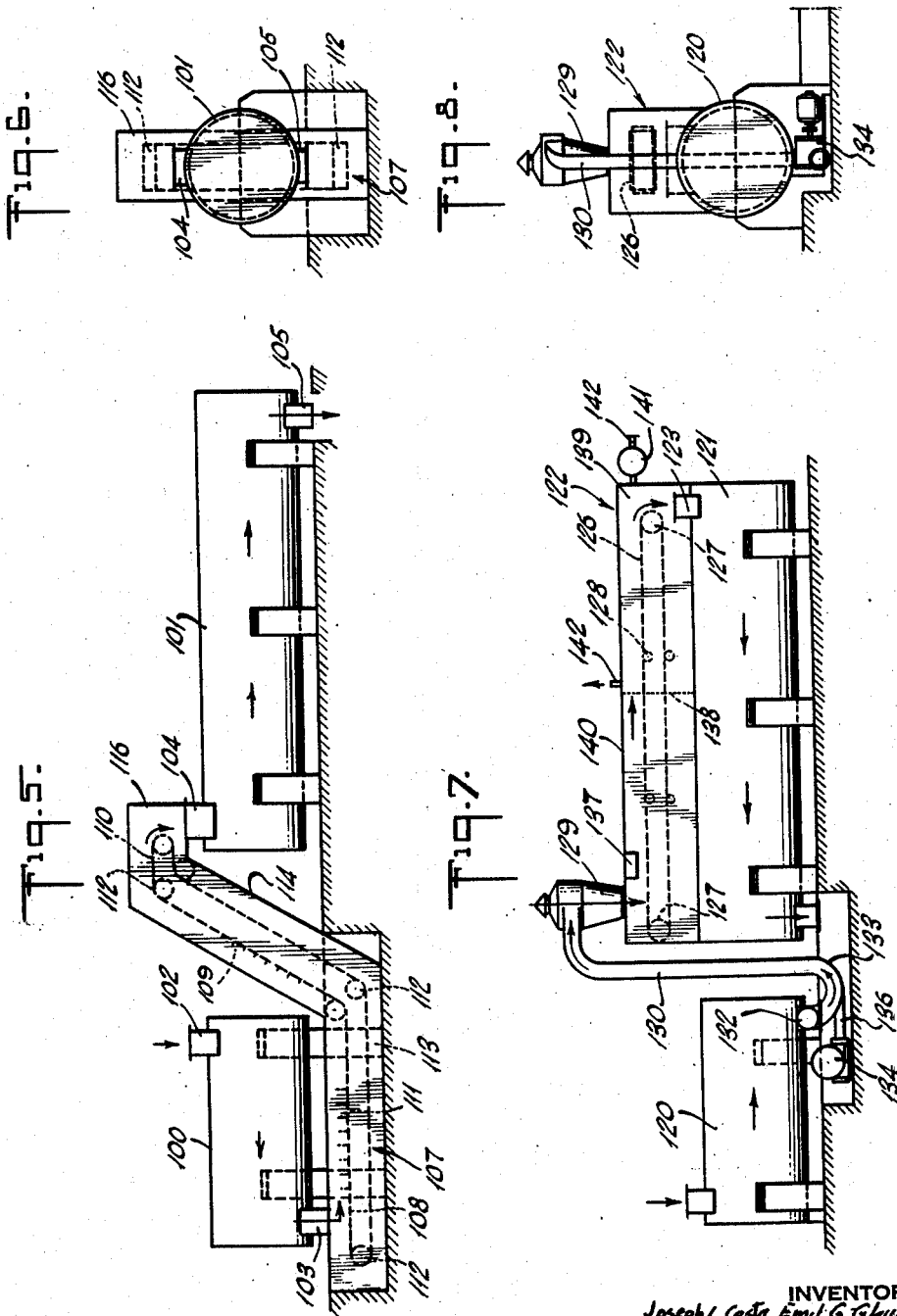

2,890,865

CHEMICAL TREATING APPARATUS

Joseph L. Costa, Hartsdale, Emil G. Glauber, Forest Hills, and Reginald A. Morse, Hartsdale, N.Y., Alfred Politzer, Cleveland, Ohio, and Franz Sixthor, Clifton, N.J., assignors to Von Kohorn International Corporation, White Plains, N.Y., a corporation of New York Application February 6, 1956, Serial No. 563,632

6 Claims. (Cl. 257—83)

The present invention relates generally to improvements in chemical apparatus and processes, and it relates more particularly to an improved method and apparatus for the continuous uniform depolymerization of cellulosic materials.

In the manufacture of regenerated cellulose products by the viscose process, such as rayon yarn, rayon staple fiber, rayon tire cord, transparent cellulose sheeting, sausage casing and similar articles, it is necessary to produce viscose, an aqueous alkaline solution of cellulose xanthate, having predetermined physical and chemical properties. Important among the characteristics of the viscose is the average degree of polymerization of the cellulose constituent thereof as well as the deviation from this average. The average degree of polymerization of the cellulose not only greatly affects the quality and physical and chemical properties of the final product, but exerts an important influence on the handling and processing of the viscose. The uniformity of the degree of polymerization of the cellulose is highly critical and any broad deviation from the average invariably results in a highly inferior product.

In accordance with the conventional methods of producing regenerated cellulose products by the viscose method, sheets of cellulose pulp having a high alpha cellulose and a very low beta and gamma cellulose content, with low pentosan and non-cellulosic constituents are immersed in a sodium hydroxide solution of mercerizing strength, about 18½% concentration, for a time sufficient to convert the cellulose to alkali cellulose. The sheets of alkali cellulose are then pressed to remove the excess sodium hydroxide solution and are then comminuted or shredded to produce alkali cellulose crumbs. The alkali cellulose crumbs are then deposited into receptacles known as aging cans, which receptacles are transported to an aging room in which the ambient conditions are closely controlled with regard to temperature and humidity. In the aging room the cellulose depolymerizes to the required chain length and the time required is normally upwards of 24 hours. It is well known that the rate of depolymerization greatly increases with temperature. However, extreme care must be exercised when depolymerizing the cellulose under increased temperatures since it is very difficult to maintain the cellulose chain length within a narrow range. It has been a common practice to comminute the alkali cellulose in a jacketed shredder under a controlled time temperature cycle to effect the depolymerization of the cellulose. The aged alkali cellulose is then tumbled with measured amounts of carbon bisulfide to produce cellulose xanthate which is dissolved in a mild sodium hydroxide solution to produce viscose which is then employed in any well known manner. It is apparent from the above that the production of viscose is a batch process and possesses the usual drawbacks and disadvantages attendant to batch processes. There are many methods of producing alkali cellulose continuously such as by a slurry system, but the uniform continuous depolymerization of the cellulose has presented many difficulties and prevented the adoption of continuous viscose producing systems.

It is thus a principal object of the present invention to provide an improved chemical apparatus.

Another object of the present invention is to provide an improved chemical process.

Still another object of the present invention is to provide an improved apparatus for use in the continuous production of viscose.

A further object of the present invention is to provide an improved apparatus for the continuous uniform depolymerization of cellulose.

Still a further object of the present invention is to provide an improved apparatus for the continuous uniform depolymerization of cellulose in the form of alkali cellulose and to prepare said alkali cellulose for conversion to cellulose xanthate.

Another object of the present invention is to provide an improved continuous cellulose depolymerization apparatus characterized by its high capacity, small size, versatility and adjustability and ruggedness.

Still another object of the present invention is to provide an improved process for the uniform continuous depolymerization of cellulose in the form of alkali cellulose, which process is simple, versatile and easy to control.

The above and other objects of the present invention will become apparent from a reading of the following description taken in conjunction with the accompanying drawings wherein:

Figure 1 is a front elevational view of a preferred embodiment of the present invention, partially broken away for convenience of illustration;

Figure 2 is an end elevational view thereof;

Figure 3 is a sectional view taken along line 3—3 of Figure 2;

Figure 4 is a sectional view taken along line 4—4 of Figure 1;

Figure 5 is a front diagrammatic view of another embodiment of the present invention;

Figure 6 is an end elevational view thereof;

Figure 7 is a diagrammatic front elevational view of still another embodiment of the present invention; and Figure 8 is an end view thereof.

A feature of the present invention is a treating unit comprising a longitudinally extending tank, a longitudinally extending screw conveyor disposed in the tank, and eccentric to the longitudinal axis of the tank and means for rotating the screw conveyor about its own axis and about the longitudinal axis of the tank. The advantages of the apparatus is the achievement of the continuous advance and the thorough admixing of the contents of the tank in a vertical laminar fashion thereby permitting uniform heating of the contents of the apparatus in accordance with any desired time temperature schedule along the length of the apparatus and the maintenance of uniform temperatures. Furthermore, the contents of the tank are advanced through the tank with a minimum of longitudinal intermixing of the contents. As an important consequence, a continuous uniform heat treatment of the contents of the tank is effected thereby permitting its application in many fields. For example, in the depolymerization of cellulose in alkali cellulose, a step in the production of rayon and other regenerated cellulose products, it is necessary to subject the alkali cellulose to closely controlled temperature conditions so that a uniform depolymerization is effected. Employing the present apparatus, this step has been satisfactorily realized in a continuous manner thereby permitting the simple continuous production of viscose. A single treating unit may be used to heat and cool the treated material or two or more units may be employed, either directly interconnected or interconnected by storage conveyors, as will be hereinafter set forth.

Referring now to the drawings and more particularly to Figures 1 through 4 thereof which illustrate a preferred embodiment of the present invention including a pair of vertically stacked interconnected treating units generally designated by the numerals 10 and 11 and referring to the upper unit and lower unit respectively, each of which units includes a cylindrical tank 12 having oppositely disposed feed ends 13 and discharge ends 14. The tank 12 may be formed in a conventional manner and includes a longitudinally extending horizontal cylindrical shell 16 having secured at its ends peripheral annular angle members providing outwardly directed end flanges 17 to which are secured end plates 18. In order to permit access to the interior of the tanks 12 each of them has formed in its upper wall a large longitudinally extending rectangular opening 19 surrounded by an upwardly directed wall 20 having an outwardly directed flange 21. A removable cover plate 22 rests on the flange 21 and is suitably secured thereto by bolts or the like. In order to permit visual inspection of the interior of the tanks 12 a plurality of windows 23 is located along the wall 20. Furthermore, rectangular access openings are formed in the tank shell 16 and have registering therewith corresponding doors 24 carried by suitable hinges 26 and normally spring urged to a closed position.

Each of the tank shells 16 is provided with two or more jackets 27, preferably more than three, which are arranged in successive longitudinal end to end relationship and extend circumferentially about the tank shell 16 clearing the doors 24 and the various openings into the tank. Each of the jackets 27 is provided with suitably flanged inlet and outlet conduits 28 and 29 respectively to permit the circulation of cooling or heating media therethrough as desired.

Each of the tanks 12 has an inlet opening 30 formed in the top wall of the shell 16 adjacent the feed ends 13 thereof, the inlet openings having secured to the edges thereof conduits 32 provided with outwardly extending flanges 33 to permit the coupling thereof to a source of material to be treated. Similarly, adjacent to the discharge ends of each of the tanks 16 in the bottom wall thereof are formed discharge openings 34 having flanged conduits 36 secured thereto. The flange of the conduit 36 of the upper unit 10 is in confronting abutment with the flange 33 of the conduit 32 of the lower unit 11 and is suitably secured thereto to connect the upper and lower units 10 and 11 in tandem.

A bracket 37 is mounted upon the lower ends of each of the tanks 12 and carries a pillow block 38 including a pedestal 39 carrying a suitable bushing bearing 40 which is coaxial with the longitudinal axis of the cylindrical shell 16. It should be noted that the bushings 40 carried by the pillow blocks 38 at opposite ends of each of the tanks 12 are of different diameters, as will be hereinafter set forth. The pillow blocks 38 are located at the drive ends of the units 10 and 11 which are the feed end of the unit 10 and discharge end of the unit 11 respectively. Rotatably engaged by the pillow blocks at the drive end of each of the tanks is a tubular shaft 41 terminating at its inner end in a gear 42 disposed within the tank 12. The end plates 13 and 14 of each of the tanks 12 have circular openings formed therein of substantially the same diameter as the interior of the respectively adjacent bushings 40. A sprocket wheel 43 is keyed to the outer end of the shaft 41.

A tubular main shaft 44 passes through the stub shaft 41 along the longitudinal axis of the tank 12 and through the bushing 40 carried by the pillow block adjacent the opposite end of the tank 12. The shafts 41 and 44 are thus independently rotatable. A sprocket wheel 46 is keyed to the free drive end of each of the shafts 44 and is spaced from the sprocket wheels 43 by hub members 45. The sprockets 43 are coupled to each other by means of a sprocket chain 47, whereas the sprockets 46 are coupled to each other by a sprocket chain 48. Also carried by the lower shaft 44 is a sprocket wheel 49, which is keyed to the shaft 44 and spaced from the sprocket wheel 46 by a hub member 50. The sprocket wheel 49 in turn is connected by a sprocket chain 51 to any suitable, adjustable drive 52. The sprocket chain 47 is engaged by a drive sprocket wheel which is likewise driven by any suitable, adjustable variable speed motor drive 53. It is thus apparent that the shafts 44 and 41 may be independently driven at any desired speed. Moreover, the upper and lower gears 42 may be driven independently of each other if desired, to permit the independent adjustments of the advance rates.

Located within each of the tanks 12 adjacent to the drive end thereof is a narrow cylindrical gear housing 56, including a rear annulus 57 closely adjacent to and confronting the end plate 13 and having an opening rotatably registering with the stub shaft 41. Projecting forward of the peripheral edge of the rear annulus 57 is a cylindrical wall 58 closely spaced to the wall of the shell 16 and carrying along its forward edge a forward circular wall 59. The front gear box wall 59 is provided with a centrally located collar 60 which is keyed to the shaft 44 and secured to the end wall 59 whereby the gear box 56 rotates with the shaft 44. A pair of diametrically opposed, longitudinally extending sleeves 61 project through and are carried by the front wall 59 of the gear box 56 and are lined with suitable bearing bushings 63.

A disc-shaped support member 65 is provided with a centrally located hub 66 which is keyed to the shaft 44 adjacent the end wall 14 opposite to the driving end of the tank 12. The disc 65 is suitably reinforced by ribs 67 and carries a pair of oppositely disposed, longitudinally extending sleeves 68 which are in alinement with the sleeves 61 carried by the gear box front wall 59. The sleeves 68 are likewise provided with suitable bearing bushings 69. Also carried by the shaft 44 and rotatable therewith is a web reinforced circular partition 70 provided with a hub 71 keyed to the shaft 44 and having a pair of large circular openings formed therein coaxial with the sleeves 61 and 68 and permitting egress of the material treated by the unit. The partition 70 is spaced forwardly of the disc 65, a distance substantially equal to the diameter of the outlet opening 34.

A longitudinally extending worm or screw conveyor 73 is associated with each pair of longitudinally spaced bushings 63 and 68 and is provided with a shaft 74 rotatably engaged by said bushings. The outer edges of the screw conveyors 73 closely approach the inner surfaces of the tanks 12. It should be noted that in the arrangement illustrated in Figure 3 of the drawings the pitch of the screw conveyors in the upper unit 10 is right-handed while the pitch of the screw conveyors of the lower unit 11 is left-handed so that when the units are driven in the same sense the material is advanced from left to right in the upper unit and from right to left in the lower unit. As will be hereinafter set forth, the direction of the advance of the treated material can be controlled by the pitch and rotation of the respective screw conveyors. The drive ends of the shafts 74 pass through the bushings 63 into the gear box 56. A spur gear 76 is keyed to the inner end of each of the shafts 74 and engages the drive gear 42. Thus, a difference in the rotational speed between the gear box 56, as controlled by way of the main shaft 44 and the sprocket wheel 46, and the gear 42, as controlled by way of the stub shaft 41 and sprocket 43, will result in a rotation of the corresponding screw conveyors 73. Thus, in the upper unit, if the gear box and the drive gear 42 are rotated clockwise at a greater angular speed than the gear 42, then the screw conveyors will be rotated clockwise advancing the treated material from left to right. On the other hand, should the gear box 56 and gear 42 be rotated counterclockwise in order to rotate the screw conveyor 73 clockwise to advance the treated material from the feed end to the discharge end, the angular velocity of the gear box should be less than that of the gear 42. Various other combinations, as well as the sense of rotation of the lower unit 11 are apparent.

The hollow main shaft 44 is provided with partitions 77 to separate the communication between the opposite interiors thereof. A plurality of pairs of longitudinally spaced hollow or tubular arms 78 and 79 projects perpendicularly from the shaft 44 between the screw conveyors 73 and communicates with opposite sides of the interior thereof. The ends of each pair of shafts 78 and 79 support a hollow scraper or paddle element 80 having a tapered leading edge 81 disposed close to the inner wall of the tank 12 and a rounded trailing edge 82. The paddle element 80, although illustrated as extending linearly, may extend along a portion of a helical path. Mounted at the free ends of each of the shafts 44 is a conventional rotating fluid coupling 83. A liquid heating or cooling medium may be introduced into one end of the shafts 44 by way of the rotating coupling 63 through one of the hollow arms 78 or 79 thence through the hollow scraper or paddle 80 back through the respective end of the hollow shaft 44 and rotatable coupling 83. Any desired heating or cooling medium may be employed, as well as the apparatus for effecting the circulation and heat control thereof.

The dimensions of the apparatus are determined by the material being treated, the uniformity desired and the time temperature schedule. For example, in a rapid continuous aging of alkali cellulose and the subsequent cooling thereof to a temperature satisfactory for the xanthation of the alkali cellulose in the production of regenerated products by the viscose method, tanks will operate highly efficiently at lengths up to 25 feet and more and diameters up to 7 feet and more. These dimensions may be greatly varied to suit the particular circumstances. The units 10 and 11 may be formed of any suitable material in accordance with the substance being processed. Furthermore, the interior surfaces, such as the inner face of the tank 12 and the screw conveyors 73, may be coated with a corrosive resistant non-wetting, non-sticking material, such as polytetrafluoroethylene or the like.

The operation of the improved apparatus is obvious from the above. The various drives are adjusted to effect the desired rate of advance and agitation. The greater the speed of the main shafts 44 the greater the admixing and the greater the longitudinal admixing of the treated material. The rate of agitation is thus adjusted to the minimum speed necessary to achieve the desired degree of uniform transverse temperature distribution. At this speed the longitudinal random intermixing is at a minimum and practically inappreciable. As previously set forth, the rate of advance of material is controlled by the relative rotation of the gear box 56 and gear 42. If desired, the rate of advance of the lower unit may be greater than that of the upper unit. The temperatures and heating and cooling of the processed material are controlled by the temperatures and flow of the media circulated through the various jackets and the paddle. For example, associated with each of the inlet openings 28 to the jackets 27 is an automatic control valve 90 whose opening is regulated by a temperature sensitive element 91 located in the material being treated adjacent to the end of the particular treatment zone. The temperature regulating system may be of any well known type, such as the electrical or hydraulic systems conventionally employed. The conveyors 73 and the paddles 80 are suitably recessed to provide clearance for the temperature responsive elements 91. The processed material is introduced or metered through the feed opening 33 in any well known manner.

Another embodiment of the present invention is illustrated in Figures 5 and 6 of the drawing and differs from the embodiment above described principally in the arrangement of the heating and cooling units and in the communication between the heating and cooling units. More particularly, there is provided first and second units 100 and 101 respectively, which are arranged and spaced in end to end relationship. The units 100 and 101 are of a construction similar to the units 10 and 11 above described being provided with similar agitating and advancing mechanisms, as well as the cooling and heating jackets and other temperature control means. The unit 100 constitutes the heating unit, which is at floor level, and includes a feed conduit 102 and an oppositely disposed bottom discharge conduit 103. The unit 101 constitutes the cooling unit and is generally of a greater capacity than the heating unit 100 being preferably of the same diameters but of greater length. The unit 101 is likewise at floor level and includes an upper feed conduit 104 and a lower oppositely disposed discharge conduit 105, each communicating with the interior of the unit 101. A belt-type conveyor 107 extends from below the discharge conduit 103 of the treating unit 100 to the feed conduit 104 of the treating unit 101. The belt conveyor 107 is provided with a horizontal advance run 108 extending below the unit 100 and upwardly forwardly inclined run 109 extending from a point below and forward of the unit 100 to a point above and rearwardly of the top of the feed conduit 104 and a short horizontal run 110 extending from the inclined run 109 to a point directly above the feed conduit 104. The conveyor belt 107 is endless and of a corrosive resistant material and is provided with transversely extending slats 111 to permit the conveying of material along the inclined run 109 without slippage. The belt 107 may be supported and actuated in any well known manner, such as being provided with sprocket chains along its edges, the sprocket chains being engaged by a plurality of suitably disposed transversely spaced pairs of sprocket wheels 112. At least one or more pairs of the sprocket wheels 112 are positively driven and the remaining sprocket wheels may be idlers. The rate of advance of the belt 107 may be varied in any well known manner and need not be driven in synchronism with the units 100 and 101. As a result, there is provided an independent means of process control since the storage time of the processed material between the units 100 and 101 may be simply adjusted.

The continuous conveyor 107, including the sprocket wheels 112, is disposed in a totally enclosed housing, including a horizontal section 113 disposed below the unit 100, an inclined section 114 enclosing the inclined run 109 of the conveyor and an upper section 116 extending from the inclined section 109 to the feed conduit 104. The housing is suitably heat-insulated and may be provided with a jacket to permit the heat control of the interior thereof.

The operation of the embodiment of the invention last described is similar to that of the earlier described embodiment except for the provision of the communicating conveyor 107. The material to be processed, for example, freshly prepared alkali cellulose, is introduced through the feed conduit 102 into the unit 100 where it is advanced and agitated while being subjected to heat as in the previously described embodiment. The uniformly heated material is discharged through the conduit 103 in a uniformly heated state onto the conveyor 107. The material is transported by the conveyor 107 while being temporarily stored thereon to the feed conduit 104 of the unit 101. While being so stored and transported by the conveyor 107, the material is heat processed. It is then discharged into the unit 101 where it is advanced and agitated while being cooled to a temperature required for further processing. The processed material is then discharged to the conduit 105 and from there to the desired apparatus. An advantage offered by the embodiment of the invention illustrated in Figures 5 and 6 is the reduction in the size of the unit 100 as compared to the unit 10 and the smaller head run required. Another advantage is the additional process control offered by the adjustability of the conveyor 107.

Still another embodiment of the present invention is illustrated in Figures 7 and 8 of the drawing which differs from the embodiment illustrated in Figures 5 and 6 only in the conveying arrangement between the heating and cooling units and the provision of a precooling system. The heating and cooling processing units are designated generally by the numerals 120 and 121 and are arranged on a common level in closely spaced end to end positions. Located above the cooling unit 121 is an insulated housing 122 which extends for the full length of the unit 101 to the feed conduit 123 thereof. Located within the housing 122 is an endless conveyor belt 126 supported and advanced by longitudinally spaced end drums 127 and supported at intermediate points by suitable idlers 128. Mounted on the top of the housing 122 at the feed end thereof and communicating with the interior of the housing directly above the feed end of the endless belt 126 is an air separator 129 of the cyclone type, the solids outlet of the separator discharging onto the belt 126 and the inlet of the air separator 129 communicating by means of a conduit 130 to the discharge opening 132 of the heating unit 120 by way of a U-shaped section 133. A blower 134 is located below the heating unit 120 and communicates with the conduit U-shaped section 133 by way of a pipe 136. Thus, the processed material discharged from the unit 120 through the opening 132 is conveyed by the air stream produced by the blower 134 up the conduit 130 and separated from the transport air by the separator 129 and thereafter discharged onto the belt 126. The air emerging from the separator 129 is preferably introduced to the inlet of the blower 134 whereby to maintain constant temperature and humidity conditions so as not to adversely effect the processed material. As in the previous embodiment, the drive of the conveyor 126 may be independent of the drive of the units 120 and 121. Furthermore, the drive shafts of the units 120 and 121 may be coupled in end to end relationship at their confronting faces.

Immediately forward of the separator 129 is a spreading device 137 of any conventional construction for distributing the material discharged from the separator 129 as a relatively thin uniform layer upon the belt 126. The housing 122 is divided into separated chambers by a suitably apertured transverse partition 138 to define a forward precooling chamber 139 and a rear storage chamber 140. A stream of cool air is directed over the material transported by the belt 126 through the chamber 139 by means of a blower 141, the inlet end of which is preferably connected to a source of the cooled air. An air outlet 142 is disposed adjacent to the trailing end of the precooling chamber 139.

The operation of the apparatus illustrated in Figures 7 and 8 is similar to that of the apparatus illustrated in Figures 5 and 6 except that the material being treated may be precooled in the chamber 139 prior to delivery to the cooling unit 121.

While there have been described and illustrated preferred embodiments of the present invention, it is apparent that numerous alterations and omissions may be made without departing from the spirit thereof.

We claim:
1. An improved material processing unit comprising a longitudinally extending tank having a feed opening adjacent one end thereof and a discharge opening adjacent the other end thereof, a longitudinally extending main shaft disposed within said tank and projecting through an end thereof, a pair of longitudinally spaced brackets carried by said shaft and rotatable therewith, said brackets being provided with a plurality of angularly spaced pairs of longitudinally aligned bearings, a plurality of screw conveyors having longitudinally extending shafts engaged between respective pairs of said bearings, each of said conveyor shafts having a gear fixed to an end thereof, a drive gear engaging said conveyor gears and means for rotating said main shaft and said drive gear at different speeds whereby said conveyor gears rotate about said main gear and about their respective axes.

2. A material processing unit in accordance with claim 1, including a cylindrical gear housing enclosing said gears, an end wall of said housing defining one of said brackets, said housing being rotatable with said main shaft.

3. A processing unit in accordance with claim 1, including a tubular stub shaft extending from said drive gear and rotatably mounted on said main shaft, said stub shaft projecting through the end wall of said tank and drive wheels fixed to said main shaft and to said stub shaft external to said tank.

4. An improved material processing unit in accordance with claim 1, including a pair of parallel hollow arms projecting radially from said main shaft between said screw conveyors, said hollow arms supporting at their ends a hollow longitudinally extending scraper blade disposed adjacent the wall of said tank and communicating with said hollow arms, said main shafts having longitudinal bores formed therein communicating with said respective arms.

5. The improved processing unit in accordance with claim 1, wherein said end brackets are of substantially disc-shaped configuration and are disposed rearwardly and forwardly of said feed opening and discharge opening respectively.

6. An improved material processing unit in accordance with claim 1, wherein said screw conveyors transversely extend between points closely adjacent to said main shaft and the inner surface of said tank.

References Cited in the file of this patent

UNITED STATES PATENTS

| | | |
|---|---|---|
| 229,932 | Witsil | July 13, 1880 |
| 1,993,264 | Duttweiler | Mar. 5, 1935 |
| 2,267,081 | Crighton | Dec. 23, 1941 |
| 2,298,079 | Adams et al. | Oct. 6, 1942 |
| 2,521,450 | Costa | Sept. 5, 1950 |
| 2,587,020 | Wicker et al. | Feb. 26, 1952 |
| 2,668,764 | Nauta | Feb. 9, 1954 |
| 2,675,716 | Harlow et al. | Apr. 20, 1954 |
| 2,677,248 | Rexford et al. | May 4, 1954 |
| 2,722,716 | Henning | Nov. 8, 1955 |
| 2,753,159 | Christian | July 3, 1956 |
| 2,809,102 | Hall | Oct. 8, 1957 |